US010290909B2

(12) United States Patent
Lee

(10) Patent No.: US 10,290,909 B2
(45) Date of Patent: May 14, 2019

(54) BATTERY MODULE HAVING TEMPERATURE SENSOR

(71) Applicant: LG CHEM, LTD., Seoul (KR)

(72) Inventor: Bum Hyun Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 216 days.

(21) Appl. No.: 15/022,738

(22) PCT Filed: Sep. 17, 2014

(86) PCT No.: PCT/KR2014/008630
§ 371 (c)(1),
(2) Date: Mar. 17, 2016

(87) PCT Pub. No.: WO2015/046798
PCT Pub. Date: Apr. 2, 2015

(65) Prior Publication Data
US 2016/0233561 A1 Aug. 11, 2016

(30) Foreign Application Priority Data
Sep. 25, 2013 (KR) .................. 10-2013-0113636

(51) Int. Cl.
H01M 10/48 (2006.01)
H01M 2/10 (2006.01)
(Continued)

(52) U.S. Cl.
CPC ....... *H01M 10/486* (2013.01); *H01M 2/1077* (2013.01); *H01M 10/0525* (2013.01);
(Continued)

(58) Field of Classification Search
CPC ... H01M 10/486; H01M 10/60; H01M 2/1077
(Continued)

(56) References Cited

U.S. PATENT DOCUMENTS 5,133,200 A * 7/1992 Tanaka .................. D06F 35/005
68/12.03
6,380,840 B1 4/2002 Wienand et al.
(Continued)

FOREIGN PATENT DOCUMENTS

EP 0809093 A1 11/1997
JP 11-345631 A 12/1999
(Continued)

OTHER PUBLICATIONS

International Search Report, issued in PCT/KR2014/008630, PCT/ISA/210, dated Dec. 29, 2014.

*Primary Examiner* — James Lee
(74) *Attorney, Agent, or Firm* — Birch, Stewart, Kolasch & Birch, LLP

(57) ABSTRACT

Disclosed herein is a battery module including two or more battery cells, which can be charged and discharged, arranged in a stacked state and cartridges for fixing the battery cells to constitute a battery cell stack, wherein each of the cartridges includes a pair of assembly type frames, which are coupled to each other in a state in which a corresponding one of the battery cells is mounted in the frames, at least one of the cartridges includes a temperature sensor mounting unit, and a temperature sensor, mounted in the temperature sensor mounting unit, is configured to have a structure in which ends of a surface of the temperature sensor contacting a corresponding one of the battery cells are rounded.

19 Claims, 6 Drawing Sheets

(51) Int. Cl.
*H01M 10/0525* (2010.01)
*H01M 10/42* (2006.01)
(52) U.S. Cl.
CPC .. *H01M 10/425* (2013.01); *H01M 2010/4271* (2013.01); *H01M 2200/105* (2013.01); *H01M 2220/20* (2013.01)
(58) Field of Classification Search
USPC .................................................. 429/62, 120
See application file for complete search history.

(56) References Cited

U.S. PATENT DOCUMENTS

| | | | |
|---|---|---|---|
| 2006/0214631 A1* | 9/2006 | Yoon | H01M 2/1061 320/112 |
| 2008/0116851 A1* | 5/2008 | Mori | H01M 2/34 320/134 |
| 2012/0088135 A1 | 4/2012 | Kim et al. | |
| 2012/0121939 A1 | 5/2012 | Yoo | |
| 2012/0141839 A1 | 6/2012 | Hong et al. | |
| 2013/0224542 A1 | 8/2013 | Kim | |
| 2015/0140366 A1* | 5/2015 | Nicholls | H01M 10/5016 429/50 |

FOREIGN PATENT DOCUMENTS

| | | |
|---|---|---|
| KR | 10-2011-0030352 A | 3/2011 |
| KR | 10-1084969 B1 | 11/2011 |
| KR | 10-2012-0053458 A | 5/2012 |
| KR | 10-2012-0059951 A | 6/2012 |
| KR | 10-2013-0096895 A | 9/2013 |
| WO | WO 2007/102672 A1 | 9/2007 |

\* cited by examiner

【FIG. 1】
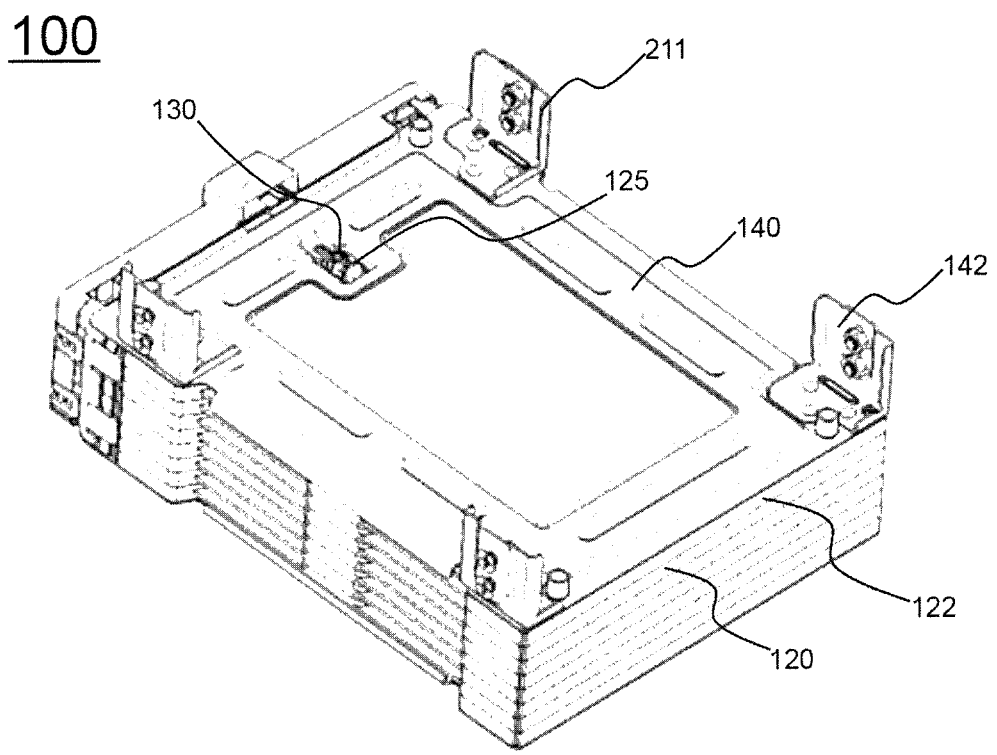

[FIG. 2]
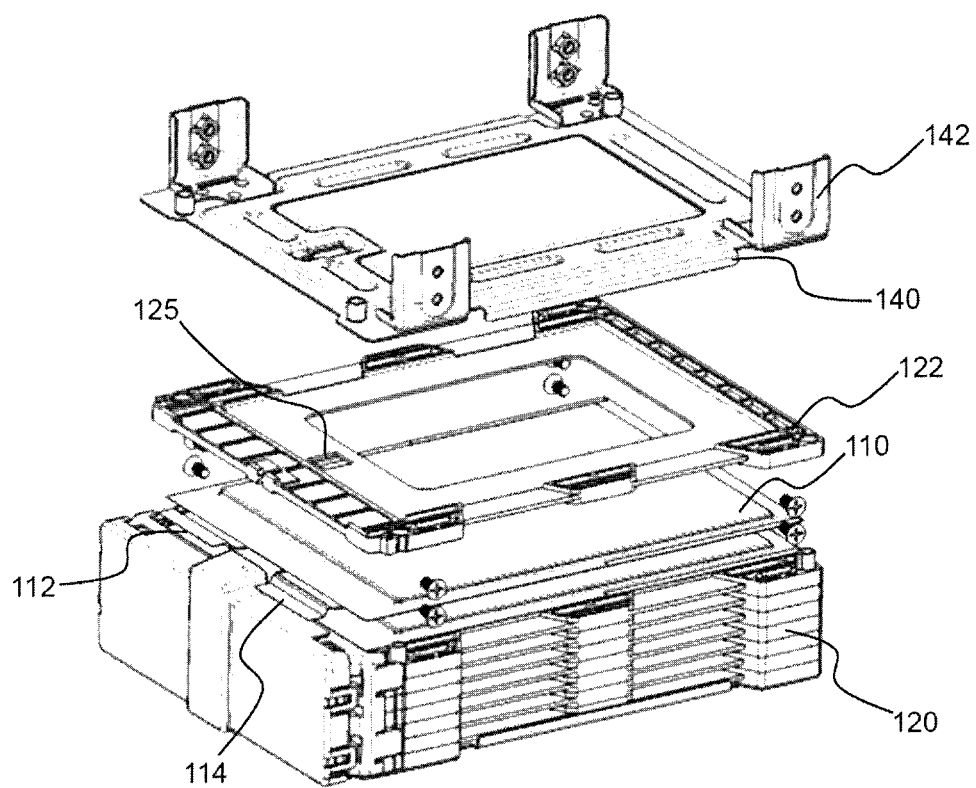

[FIG. 3]
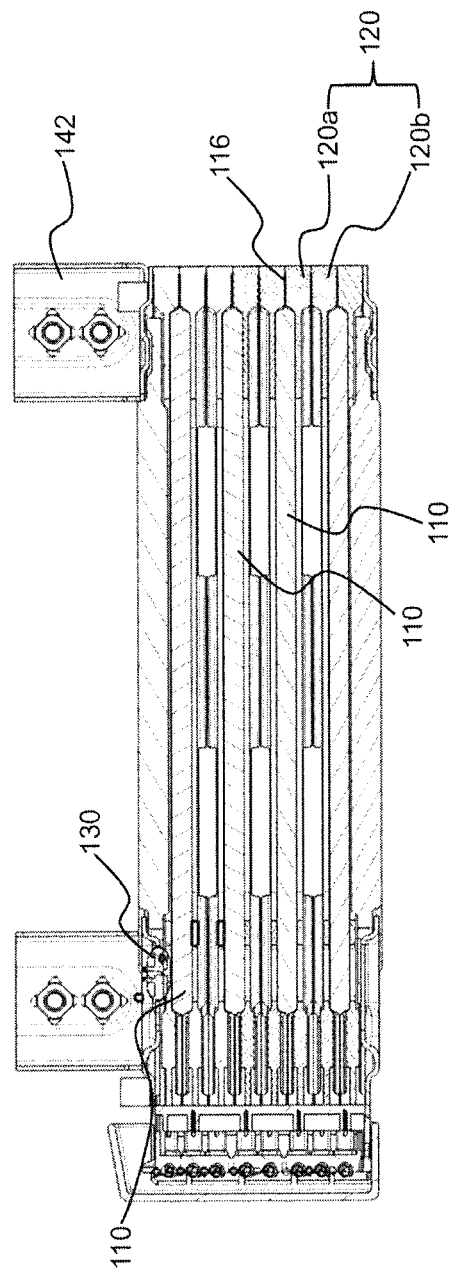

[FIG. 4]
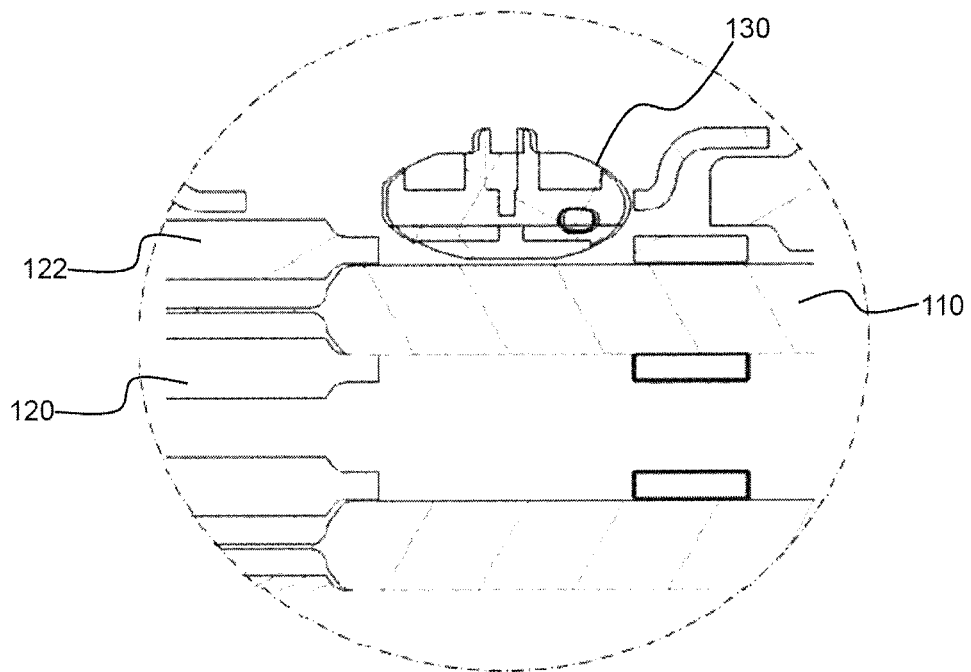
[FIG. 5]
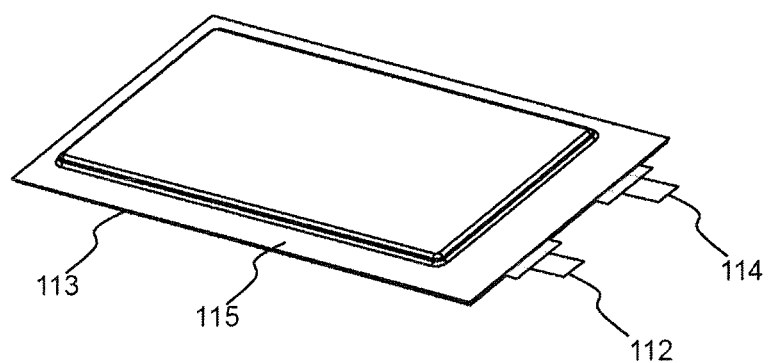

[FIG. 6]
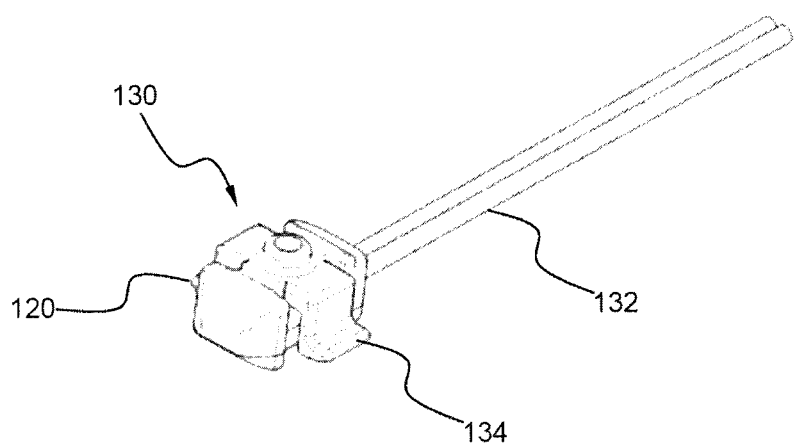
[FIG. 7]
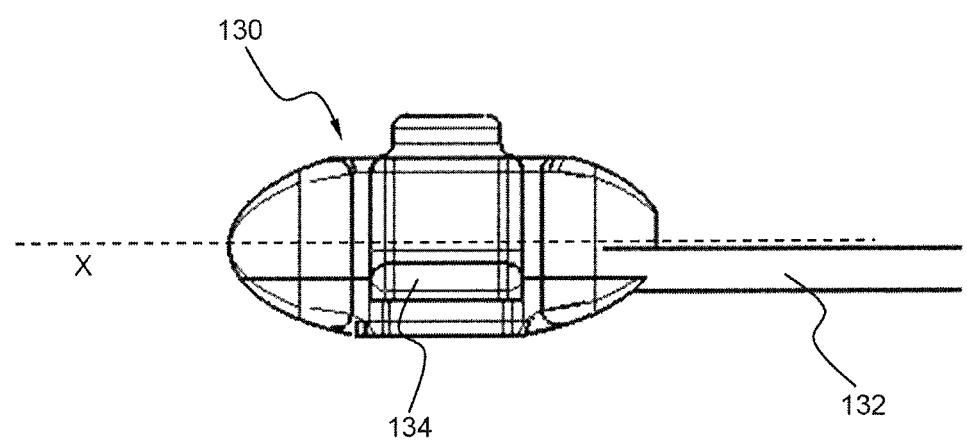

[FIG. 8]
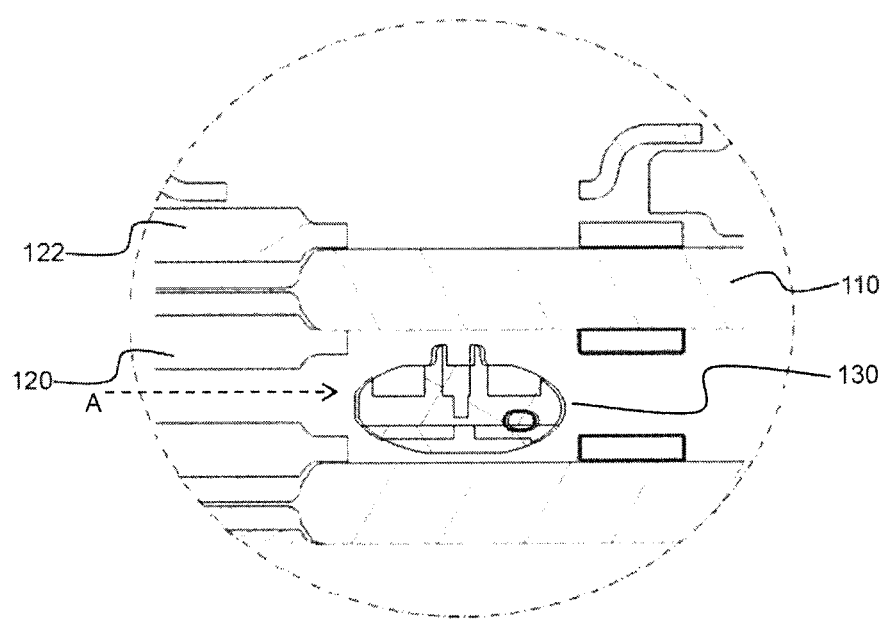

BATTERY MODULE HAVING TEMPERATURE SENSOR

TECHNICAL FIELD

The present invention relates to a battery module having a temperature sensor.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a battery module having a plurality of battery cells electrically connected to each other because high output and large capacity are necessary for the middle or large-sized devices.

Preferably, the battery module is manufactured so as to have as small a size and weight as possible. For this reason, a prismatic battery or a pouch-shaped battery, which can be stacked with high integration and has a small weight to capacity ratio, is usually used as a battery cell (a unit cell) of the battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Battery cells constituting such a battery module are secondary batteries which can be charged and discharged. Consequently, a large amount of heat is generated from the high-output, large-capacity secondary batteries during the charge and discharge of the secondary batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

If the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a high-output, large-capacity battery module needs a mean for measuring and controlling the temperatures of battery cells mounted in the battery module.

To this end, a temperature sensor is connected to the battery cells for monitoring and controlling the operations of the battery cells in real time or at predetermined intervals. However, installation or connection of such a detection means very complicates a process of assembling the battery module, and a short circuit may occur due to wiring for installation or connection of the detection means.

For example, in a conventional battery module, a temperature sensor is located between the battery cells to measure the temperatures of the battery cells and thus the temperature in the battery module. The battery module is configured to have a structure in which the temperature sensor directly contacts the surface of each of the battery cells in order to more accurately measure the temperatures of the battery cells.

However, several problems occur when the temperature sensor is mounted in the battery module. For example, it is difficult and troublesome to insert the temperature sensor between the battery cells due to the internal structure of the battery module, which is very complicated due to a plurality of components constituting the battery module.

In addition, the surfaces of the battery cells are scratched when the temperature sensor is inserted between the battery cells. In this case, the battery module may malfunction, a short circuit may occur in the battery module, or the lifespan of the battery cells is reduced.

Consequently, there is a high necessity for a battery module that is capable of solving the above problems.

DISCLOSURE

Technical Problem

Therefore, the present invention has been made to solve the above problems, and other technical problems that have yet to be resolved.

Specifically, it is an object of the present invention to provide a battery module having a temperature sensor, the structure and installation position of which are improved such that the temperature sensor more stably and efficiently measure the temperatures of the battery cells and which can be effectively mounted in the battery module even in a case in which the battery module has a structure in which it is difficult to mount the temperature sensor between the battery cells.

Technical Solution

In accordance with one aspect of the present invention, the above and other objects can be accomplished by the provision of a battery module including two or more battery cells, which can be charged and discharged, arranged in a stacked state and cartridges for fixing the battery cells to constitute a battery cell stack, wherein each of the cartridges includes a pair of assembly type frames, which are coupled to each other in a state in which a corresponding one of the battery cells is mounted in the frames, at least one of the cartridges includes a temperature sensor mounting unit, and a temperature sensor, mounted in the temperature sensor mounting unit, is configured to have a structure in which ends of a surface of the temperature sensor contacting a corresponding one of the battery cells are rounded.

That is, the battery module according to the present invention may be configured to have a structure that is capable of preventing the surface of a corresponding one of the battery cells from being scratched due to the rounded structure of the temperature sensor when the temperature sensor is mounted such that the temperature sensor contacts the surface of the corresponding battery cell, thereby preventing damage to the battery cell, improving the safety of the battery cell, and preventing the reduction in lifespan of the battery cell.

In addition, the rounded temperature sensor is more easily mounted in the temperature sensor mounting unit than a conventional temperature sensor, i.e. an angled temperature sensor, thereby improving assembly efficiency of the battery module.

Each of the battery cells is not particularly restricted so long as each of the battery cells is a secondary battery that is capable of providing high voltage and high current when a battery module or a battery pack is manufactured using the battery cells. For example, each of the battery cells may be a lithium secondary battery having a large amount of energy storage per volume.

For example, each of the battery cells may be a rectangular plate-shaped battery cell. The plate-shaped battery cell may be a pouch-shaped battery cell configured to have a structure in which an electrode assembly is mounted in a cell case made of a laminate sheet including a resin layer and a metal layer, and the outer edge of the cell case is sealed. In addition, each of the battery cells may be configured to have a structure in which a positive electrode terminal and a negative electrode terminal protrude from one side of the outer edge thereof or a structure in which the positive electrode terminal protrudes from one side of the outer edge of thereof and the negative electrode terminal protrudes from the other side of the outer edge thereof.

Specifically, each of the battery cells may be a pouch-shaped battery cell configured to have a structure in which an electrode assembly of a positive electrode, separator, and negative electrode structure is contained in a battery case together with an electrolyte in a sealed state. Each of the battery cells may be a plate-shaped battery cell configured to have an approximately rectangular hexahedral structure having a small thickness to width ratio. In general, the pouch-shaped battery cell may include a pouch-shaped battery case. The battery case is configured to have a laminate sheet structure in which an outer coating layer made of a polymer resin exhibiting high durability, a barrier layer made of a metal material blocking moisture or air, and an inner sealant layer made of a thermally bondable polymer resin are sequentially stacked.

The battery case of the pouch-shaped battery cell may be configured to have various structures. For example, the battery case of the pouch-shaped battery cell may be configured to have a structure in which an electrode assembly is received in a receiving part formed at an upper inner surface and/or a lower inner surface of a two-unit member, and the upper and lower contact regions of the outer edge of the battery case are sealed by thermal bonding.

Meanwhile, each of the cartridges may include a pair of assembly type frames, which are vertically coupled to each other, and an outer edge sealed portion of a corresponding one of the battery cells may be fixed between the frames.

In a concrete example, the temperature sensor mounting unit is formed in a corresponding one of the frames of the uppermost one of the cartridges. That is, the temperature sensor, which is mounted in the temperature sensor mounting unit, may be configured to have a structure in which the temperature sensor contacts the top surface of the battery cell fixed to the uppermost cartridge to measure the temperature of the battery cell.

For example, the temperature sensor mounting unit may be configured to have an opening structure in which a corresponding one of the battery cells is exposed upward through the temperature sensor mounting unit. In this case, the temperature sensor may be inserted into the temperature sensor mounting unit from above.

In addition, the temperature sensor mounting unit may be formed in a region of one of the frames corresponding to electrode terminals of a corresponding one of the battery cells. Most short circuits occur at the electrode terminals of the battery cell. As a result, the temperature of the battery cell increases. The temperature sensor contacts the outer surface of the battery cell at the region of the battery cell adjacent to the electrode terminals. Consequently, it is possible for the temperature sensor to more rapidly measure the increase in temperature of the battery cell due to abnormality of the battery cell.

The temperature sensor is not particularly restricted so long as the temperature sensor is a member mounted in the temperature sensor mounting unit to measure the temperature of a corresponding one of the battery cells. For example, the temperature sensor may be a thermistor.

The structure of the temperature sensor is not particularly restricted so long as the temperature sensor has a rounded structure. For example, the temperature sensor may be configured to have an oval structure in vertical section in which the major axis of the temperature sensor is parallel to a corresponding one of the battery cells. Consequently, it is possible to minimize the increase in height of the battery cell stack after the temperature sensor is mounted.

In a concrete example, the battery module may further include a controller connected to the temperature sensor for controlling the operation of the battery module. For example, the controller may be a battery management system (BMS) for monitoring and controlling the operation of the battery module. The BMS may be mounted at one side of the battery module in a state of being connected to the temperature sensor.

One of the cartridges may be provided at the top surface thereof with a groove, in which a wire of the temperature sensor is located. As a result, the wire of the temperature sensor is located in the groove, whereby it is possible to prevent interference with other components and wires in the battery module or prevent the occurrence of noise due to such interference.

The groove may be provided with one or more catching protrusions for preventing the wire of the temperature sensor from being separated from the groove such that the wire of the temperature sensor is located and fixed in the groove.

In addition, the temperature sensor may be provided at at least one side thereof with a hook coupled to the temperature sensor mounting unit for preventing the temperature sensor being separated from the temperature sensor mounting unit and fixing the temperature sensor in position after the temperature sensor is mounted in the temperature sensor mounting unit. For example, the hook may be formed at each side of the temperature sensor. However, the number or shape of hooks necessary for the temperature sensor to be stably mounted in the temperature sensor mounting unit is not particularly restricted.

Meanwhile, the battery module according to the present invention may further include a sheathing member loaded on the uppermost one of the cartridges for fastening the battery cell stack to an external device. The sheathing member may be formed to have a shape corresponding to a corresponding one of the frames of the uppermost cartridge, and the sheathing member may include a cover for covering the temperature sensor mounting unit in a state in which the temperature sensor is mounted in the temperature sensor mounting unit.

In the above description, the temperature sensor mounting unit is formed at the uppermost cartridge. Alternatively, temperature sensor mounting units may be formed at all of the cartridges, or temperature sensor mounting units may be formed at some of the cartridge, for example two or more cartridges. In this case, the temperature sensor may be freely mounted in the uppermost cartridge, the lowermost cartridge, or between the cartridges.

For example, in a case in which the temperature sensor is neither mounted in the uppermost cartridge nor the lowermost cartridge but is mounted between the cartridges, the temperature sensor may be inserted between the cartridges from one side of the battery cell stack such that the temperature sensor is located between the battery cells of the battery cell stack. In this case, the temperature sensor may be configured to have a structure in which ends of the surfaces of the temperature sensor contacting the battery cells are rounded. Preferably, the temperature sensor is formed to have an oval structure in vertical section. Consequently, it is possible to prevent the battery cells or the cartridges from being scratched during insertion of the temperature sensor between the cartridges and to easily insert the temperature sensor between the cartridges.

The above structure provides greater effects in a case in which the structure is applied to a battery module including stacked pouch-shaped battery cells, the surfaces of which may be easily scratched.

In accordance with another aspect of the present invention, there is provided a battery pack including the battery module as a unit module.

The battery pack may be manufactured by combining battery modules as unit modules of the battery pack based on desired output and capacity. The battery pack according to the present invention may be used as a power source for electric vehicles, hybrid electric vehicles, plug-in hybrid electric vehicles, or power storage apparatuses in consideration of installation efficiency and structural stability. However, the present invention is not limited thereto.

In accordance with a further aspect of the present invention, there is provided a device including the battery pack as a power source. Specifically, the device may be an electric vehicle, a hybrid electric vehicle, a plug-in hybrid electric vehicle, or a power storage apparatus.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery module according to an embodiment of the present invention;

FIG. 2 is a perspective view showing the battery module of FIG. 1 in a state in which the upper part of the battery module is disassembled;

FIG. 3 is a vertical sectional view of FIG. 1;

FIG. 4 is an enlarged view of FIG. 3 showing a region of the battery module at which a temperature sensor is mounted;

FIG. 5 is a perspective view showing a battery cell, which is mounted in the battery module of FIG. 1;

FIG. 6 is a perspective view showing the temperature sensor;

FIG. 7 is a side view showing the temperature sensor; and

FIG. 8 is an enlarged view showing another embodiment of the region of the battery module at which the temperature sensor is mounted.

BEST MODE

Now, preferred embodiments of the present invention will be described in detail with reference to the accompanying drawings. It should be noted, however, that the scope of the present invention is not limited by the illustrated embodiments.

FIG. 1 is a perspective view showing a battery module according to an embodiment of the present invention, and FIG. 2 is a perspective view showing the battery module of FIG. 1 in a state in which the upper part of the battery module is disassembled.

Referring to FIGS. 1 and 2, a battery module 100 is configured to have a structure including a plurality of battery cells 110 and cartridges 120 for fixing the battery cells 110 to constitute a battery cell stack. A temperature sensor mounting unit 125 is formed at the uppermost cartridge 122 of the battery cell stack, and a temperature sensor 130 is mounted in the temperature sensor mounting unit 125.

The temperature sensor mounting unit 125 is configured to have an opening structure in which the temperature sensor mounting unit 125 is formed through the uppermost cartridge 122 of the battery cell stack such that a corresponding one of the battery cells 110 is exposed upward through the temperature sensor mounting unit 125 and such that the temperature sensor 130 contacts the top surface of the corresponding battery cell 110 when the temperature sensor 130 is mounted in the temperature sensor mounting unit 125.

That is, the temperature sensor 130 is configured to have a structure in which the temperature sensor 130 contacts the top surface of the battery cell 110 fixed to the uppermost cartridge 122 to measure the temperature of the battery cell 110. In addition, the temperature sensor mounting unit 125 is formed in one side of a frame constituting the uppermost cartridge 122 at which electrode terminals 112 and 114 of the battery cell 110 are located such that the temperature sensor 130 is located on the top surface of the battery cell 110. Consequently, the temperature sensor 130 contacts the top of the battery cell 110 at a region of the battery cell 110 adjacent to the electrode terminals 112 and 114.

The temperature sensor 130 is easily mounted into the temperature sensor mounting unit 125 by inserting the temperature sensor 130 into the temperature sensor mounting unit 125 from above.

Meanwhile, a sheathing member 140 for fastening the battery cell stack to an external device is loaded on the uppermost cartridge 122. The sheathing member 140 is formed to have a shape corresponding to the frame of the uppermost cartridge 122. The sheathing member 140 is provided at each corner thereof with an external coupling part 142 extending outward.

FIG. 3 is a vertical sectional view of FIG. 1, and FIG. 4 is an enlarged view of FIG. 3 showing a region of the battery module at which the temperature sensor is mounted.

Referring to FIGS. 3 and 4 together with FIG. 2, each of the cartridges 120 includes a pair of assembly type frames 120a and 120b, which are vertically coupled to each other. An outer edge sealed portion 116 of a corresponding one of the pouch-shaped battery cells 110 is fixed between the frames 120a and 120b.

The temperature sensor 130 is approximately formed to have an oval structure in vertical section. A portion of the bottom surface of the temperature sensor 130 is flat such that the temperature sensor 130 is disposed on a corresponding one of the battery cells 110 in a state in which the temperature sensor 130 is in surface contact with the corresponding battery cell 110.

Meanwhile, the temperature sensor 130 may be mounted such that the temperature sensor 130 contacts the top surface of the uppermost battery cell 110 to measure the temperature of the uppermost battery cell 110, as shown in FIG. 3.

Alternatively, the temperature sensor 130 may be mounted between two neighboring cartridges 120. When the temperature sensor 130 is inserted between the two neighboring cartridges 120 such that the temperature sensor 130 contacts the surface of the uppermost battery cell 110, the temperature sensor 130 may be easily inserted and mounted between the cartridges 120 due to the oval structure of the temperature sensor 130. In addition, the surface of the battery cell 110 is prevented from being scratched, whereby improving the safety of the battery cell 110.

FIG. 5 is a perspective view showing a battery cell, which is mounted in the battery module of FIG. 1.

Referring to FIG. 5, the battery cell 110 is a plate-shaped battery cell 110 having electrode terminals (a positive electrode terminal 112 and a negative electrode terminal 114) formed at one end thereof. Specifically, the plate-shaped battery cell 110 is configured to have a structure in which an electrode assembly (not shown) is mounted in a pouch-shaped battery case 113 made of a laminate sheet including a metal layer (not shown) and a resin layer (not show), and a sealed portion 115 is formed at the battery case 113, for example, by thermal bonding. In general, the plate-shaped battery cell 110 may also be referred to as a pouch-shaped battery cell.

FIG. 6 is a perspective view showing the temperature sensor, and FIG. 7 is a side view showing the temperature sensor.

Referring to FIGS. 6 and 7 together with FIG. 2, the temperature sensor 130 is configured to have a structure in which the width of the temperature sensor 130 is greater than the height of the temperature sensor 130 so as to minimize the increase in height of the battery cell stack after the temperature sensor 130 is mounted and to increase the contact area between the temperature sensor 130 and the battery cell 110. That is, the temperature sensor 130 is configured to have an oval structure in vertical section in which the major axis X of the temperature sensor 130 is parallel to the battery cell 110. A wire 132 is connected to one side of the temperature sensor 130.

The temperature sensor 130 is provided at opposite sides thereof with hooks 134 and 135 for preventing the temperature sensor 130 being separated from the temperature sensor mounting unit 125 and fixing the temperature sensor 130 in position. After the temperature sensor 130 is inserted into the temperature sensor mounting unit 125, therefore, the temperature sensor 130 is fixed in the temperature sensor mounting unit 125 by the hooks 134 and 135.

FIG. 8 is an enlarged view showing another embodiment of the region of the battery module at which the temperature sensor is mounted.

Referring to FIG. 8, the temperature sensor 130 is configured to have an oval structure in vertical section in which the major axis X of the temperature sensor 130 is parallel to battery cells 110. The temperature sensor 130 is mounted between two neighboring battery cells 110 from one side of the battery cell stack in an inserting fashion. Specifically, the temperature sensor 130 is inserted into the battery cell stack in a direction denoted by A from one side of the battery cell stack. The temperature sensor 130 has an oval structure in vertical section. When the temperature sensor 130 is inserted into the battery cell stack, therefore, insertion of the temperature sensor 130 into the battery cell stack may be easily achieved without damage, such as scratches, to the surfaces of the battery cells 110 or the cartridges 120.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

INDUSTRIAL APPLICABILITY

As is apparent from the above description, the battery module according to the present invention is configured to have a structure in which the surface of a temperature sensor contacting a battery cell is rounded. Consequently, it is possible to prevent the surface of the battery cell from being scratched when the temperature sensor is mounted such that the temperature sensor contacts the surface of the battery cell, thereby preventing damage to the battery cell, improving the safety of the battery cell, and preventing the reduction in lifespan of the battery cell.

In addition, the rounded temperature sensor is more easily mounted in a temperature sensor mounting unit than a conventional temperature sensor, i.e. an angled temperature sensor, thereby improving assembly efficiency of the battery module.

The invention claimed is:

1. A battery module comprising:
two or more battery cells, which can be charged and discharged, arranged in a stacked state;
cartridges for fixing the battery cells to constitute a battery cell stack, wherein each of the cartridges comprises a pair of assembly type frames, which are coupled to each other in a state in which a corresponding one of the battery cells is mounted in the frames and each cartridge having a first central opening;
a temperature sensor mounting unit extending in a first direction into the first central opening from a side of one of the cartridges, the temperature sensor mounting unit having a top surface, a bottom surface, side edges extending in the first direction and an end edge extending between the side edges; and
a temperature sensor, mounted on the top surface of the temperature sensor mounting unit, the temperature sensor having a top surface and a flat bottom surface, a pair of sides extending in the first direction and a leading end extending between the pair of sides, the leading end being convexly rounded, the flat bottom surface contacting one of the battery cells,
wherein the temperature sensor mounting unit has a second opening extending through the top surface and bottom surface of the temperature sensor mounting unit, and
wherein a top surface of the battery cell contacted by the temperature sensor is exposed through the second opening.

2. The battery module according to claim 1, wherein each of the battery cells is a rectangular plate-shaped battery cell.

3. The battery module according to claim 2, wherein the plate-shaped battery cell is a pouch-shaped battery cell configured to have a structure in which an electrode assembly is mounted in a cell case made of a laminate sheet comprising a resin layer and a metal layer, and an outer edge of the cell case is sealed.

4. The battery module according to claim 2, wherein each of the battery cells is configured to have a structure in which a positive electrode terminal and a negative electrode terminal protrude from one side of an outer edge thereof or a structure in which the positive electrode terminal protrudes from one side of the outer edge of thereof and the negative electrode terminal protrudes from the other side of the outer edge thereof.

5. The battery module according to claim 1, wherein each of the cartridges comprises a pair of assembly type frames, and an outer edge sealed portion of a corresponding one of the battery cells is fixed between the frames.

6. The battery module according to claim 1, wherein the temperature sensor mounting unit is formed in an uppermost one of the cartridges.

7. The battery module according to claim 1, wherein the temperature sensor mounting unit is formed in a region of one of the frames corresponding to electrode terminals of a corresponding one of the battery cells.

8. The battery module according to claim 1, wherein the temperature sensor is a thermistor.

9. The battery module according to claim 1, wherein the temperature sensor is configured to have an oval structure in vertical section in which a major axis of the temperature sensor is parallel to the first direction.

10. The battery module according to claim 1, further comprising a controller connected to the temperature sensor for controlling operation of the battery module.

11. The battery module according to claim 1, wherein at least one of the cartridges is provided at a top surface thereof with a groove, in which a wire of the temperature sensor is located.

12. The battery module according to claim 11, wherein the groove is provided with one or more catching protrusions for preventing the wire of the temperature sensor from being separated from the groove.

13. The battery module according to claim 1, wherein the temperature sensor is provided at at least one side thereof with a hook configured to be coupled to the temperature sensor mounting unit.

14. The battery module according to claim 1, further comprising a sheathing member loaded on an uppermost one of the cartridges for fastening the battery cell stack to an external device.

15. The battery module according to claim 14, wherein the sheathing member is formed to have a shape corresponding to a corresponding one of the frames of the uppermost cartridge, and the sheathing member comprises a cover for covering the temperature sensor mounting unit in a state in which the temperature sensor is mounted in the temperature sensor mounting unit.

16. The battery module according to claim 1, wherein the temperature sensor is mounted between the cartridges from one side of the battery cell stack in an inserting fashion.

17. A battery pack comprising a battery module according to claim 1 as a unit module.

18. A device comprising a battery pack according to claim 17.

19. The device according to claim 18, wherein the device is an electric vehicle, a hybrid electric vehicle, a plug-in hybrid electric vehicle, or a power storage apparatus.

* * * * *